United States Patent
Wu et al.

(10) Patent No.: US 11,381,418 B2
(45) Date of Patent: Jul. 5, 2022

(54) SMART HOME CONTROL SYSTEM

(71) Applicant: PIXART IMAGING INC., Hsin-Chu County (TW)

(72) Inventors: Sung-Han Wu, Hsin-Chu County (TW); Yi-Hsien Ko, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 16/683,946

(22) Filed: Nov. 14, 2019

(65) Prior Publication Data
US 2021/0152387 A1 May 20, 2021

(51) Int. Cl.
*H04L 12/28* (2006.01)

(52) U.S. Cl.
CPC ........ *H04L 12/282* (2013.01); *H04L 12/2809* (2013.01); *H04L 12/2829* (2013.01)

(58) Field of Classification Search
CPC .............. H04L 12/282; H04L 12/2829; H04L 12/2809
See application file for complete search history.

(56) References Cited

U.S. PATENT DOCUMENTS

| | | | |
|---|---|---|---|
| 2003/0227439 A1* | 12/2003 | Lee | H05B 47/125 345/156 |
| 2012/0075058 A1* | 3/2012 | Takenaka | G07C 9/38 340/5.6 |
| 2013/0279706 A1 | 10/2013 | Marti | |
| 2015/0039105 A1 | 2/2015 | Lee | |
| 2015/0156030 A1 | 6/2015 | Fadell et al. | |
| 2016/0217638 A1* | 7/2016 | Child | H04L 12/2803 |
| 2016/0291671 A1 | 10/2016 | Rider et al. | |
| 2018/0047230 A1* | 2/2018 | Nye | H04L 12/282 |
| 2018/0048230 A1 | 2/2018 | Park et al. | |
| 2019/0013960 A1 | 1/2019 | Sadwick | |
| 2019/0028290 A1* | 1/2019 | Jeong | H04L 12/2816 |
| 2019/0065980 A1* | 2/2019 | Yamaguchi | H04L 12/6418 |
| 2019/0272691 A1* | 9/2019 | Nye | H04L 12/2803 |
| 2019/0281878 A1* | 9/2019 | Tang | A61B 5/4866 |
| 2020/0003482 A1* | 1/2020 | Kim | F25D 23/028 |
| 2020/0028703 A1* | 1/2020 | Homsi | G06N 3/08 |
| 2020/0088463 A1* | 3/2020 | Jeong | G06F 3/167 |

* cited by examiner

Primary Examiner — Charles R Kasenge
(74) Attorney, Agent, or Firm — Hauptman Ham, LLP

(57) ABSTRACT

There is provided a smart home control system including a host, at least one sensor, a plurality of controlled devices and an informing device. The host identifies entering and leaving of family members according to detection results of the at least one sensor, and controls on/off of the controlled devices or informs a specific family member by the informing device to execute agenda according to a member ID of a family member who is identified to enter or leave the house.

14 Claims, 4 Drawing Sheets

| | state indication | switch control |
|---|---|---|
| member1 | 1 (home) | 1st member enter or leave, turning on/off 1st switch set |
| member2 | 0 (absent) | 2nd member enter or leave, turning on/off 2nd switch set |
| member3 | 1 (home) | 3rd member enter or leave, turning on/off 3rd switch set |
| . . | . . | stay member combination I, 1st switch combination |
| . . . | . . . | stay member combination II, 2nd switch combination |

| | state indication | switch control |
|---|---|---|
| member1 | 1 (home) | 1st member enter or leave, turning on/off 1st switch set |
| member2 | 0 (absent) | 2nd member enter or leave, turning on/off 2nd switch set |
| member3 | 1 (home) | 3rd member enter or leave, turning on/off 3rd switch set |
| . . . | . . . | stay member combination I, 1st switch combination |
| | | stay member combination II, 2nd switch combination . . . |

FIG. 2

SMART HOME CONTROL SYSTEM

BACKGROUND

1. Field of the Disclosure

This disclosure generally relates to a smart home control system and, more particularly, to a smart home control system that turns on and off multiple electronic devices or informs a specific family member to execute recorded agenda according to the entering and leaving of family members.

2. Description of the Related Art

The smart home is one part of developing a smart city. However, in addition to basic controls of home appliances and lamps, it is also an important issue in a smart home to perform controls corresponding to different family members because different family members generally have different requirements. Besides, when multiple different events are detected, if the system can identify the relationship between the multiple different events and actively give a suggestion to deal with the related events together, performance of the smart home can be further improved, thereby increasing the life convenience.

Accordingly, the present disclosure provides a smart home control system that performs the indoor control or message prompting according to the ID of a member who enters or leaves the house to allow the smart home to be more user-friendly.

SUMMARY

The present disclosure provides a smart home control system that turns on and off control switches according to the member ID of staying members and/or absent members to improve the security and convenience of life.

The present disclosure further provides a smart home control system that identifies the relationship between recorded agenda and current events, and informs a specific member to execute the agenda related to the current event to improve the user experience of the smart home.

The present disclosure provides a smart home control system including a plurality of control switches, a memory, a sensor and a host. The memory is configured to previously store a correspondence relationship between multiple family members and the plurality of control switches. The sensor is configured to acquire activity data of the multiple family members. The host is coupled to the memory and the sensor, and configured to receive the activity data to accordingly identify a member ID of a entering or leaving member among the multiple family members, and access the correspondence relationship in the memory according to staying members among the multiple family members to control the plurality of control switches.

The present disclosure further provides a smart home control system including a memory, multiple sensors and a host. The memory is configured to record multiple agenda each being recorded using an item code comprising at least one of a member bit, a category bit, a temporal bit and a position bit. The host is coupled to the memory and the multiple sensors, and configured to give a new item code of a new agendum to be added in the memory when one of the multiple sensors detects the new agendum, give an event code of a current event when the current event is recognized, and compare the event code with recorded multiple item codes to determine related agenda of the current event among the multiple agenda.

The present disclosure further provides a smart home control system including a memory, multiple sensors and a host. The memory is configured to record at least one agendum which is recorded using an item code comprising at least one of a member bit, a category bit, a temporal bit and a position bit. The host is coupled to the memory and the multiple sensors, and configured to give an event code of an absent event to be recorded in the memory when the absent event is recognized, give a new item code of a new agendum when one of the multiple sensors detects the new agendum, and compare the new item code with the recorded event code to determine whether the new agendum is a related agendum of the absent event.

In the present disclosure, the agenda include items triggered or not triggered by a member. For example, detecting an object storage at home by a sensor is considered not being triggered by a member, accessing content in an electronic calendar may be considered being triggered by a member, and analyzing the conversation of family members is considered being triggered by a member. The agenda include, for example, at least one of purchasing objects, people contact, paying bills, carrying objects, proceeding positions or the like.

In the present disclosure, the current event is generally triggered by a family member, e.g., including family member exiting and family member having a phone call.

BRIEF DESCRIPTION OF THE DRAWINGS

Other objects, advantages, and novel features of the present disclosure will become more apparent from the following detailed description when taken in conjunction with the accompanying drawings.

FIG. 2 is a schematic diagram of correspondence relationship in a smart home control system according to a first embodiment of the present disclosure.

DETAILED DESCRIPTION OF THE EMBODIMENT

It should be noted that, wherever possible, the same reference numbers will be used throughout the drawings to refer to the same or like parts.

The smart home control system of the present disclosure is used to identify the entering and leaving of a family member according to detection results of at least one sensor, and to control the on/off or strength of a plurality of controlled devices or to inform a specific family member to execute recorded agenda by an informing device according to a ID of the family member who is identified to enter or leave the house.

Figure 1:
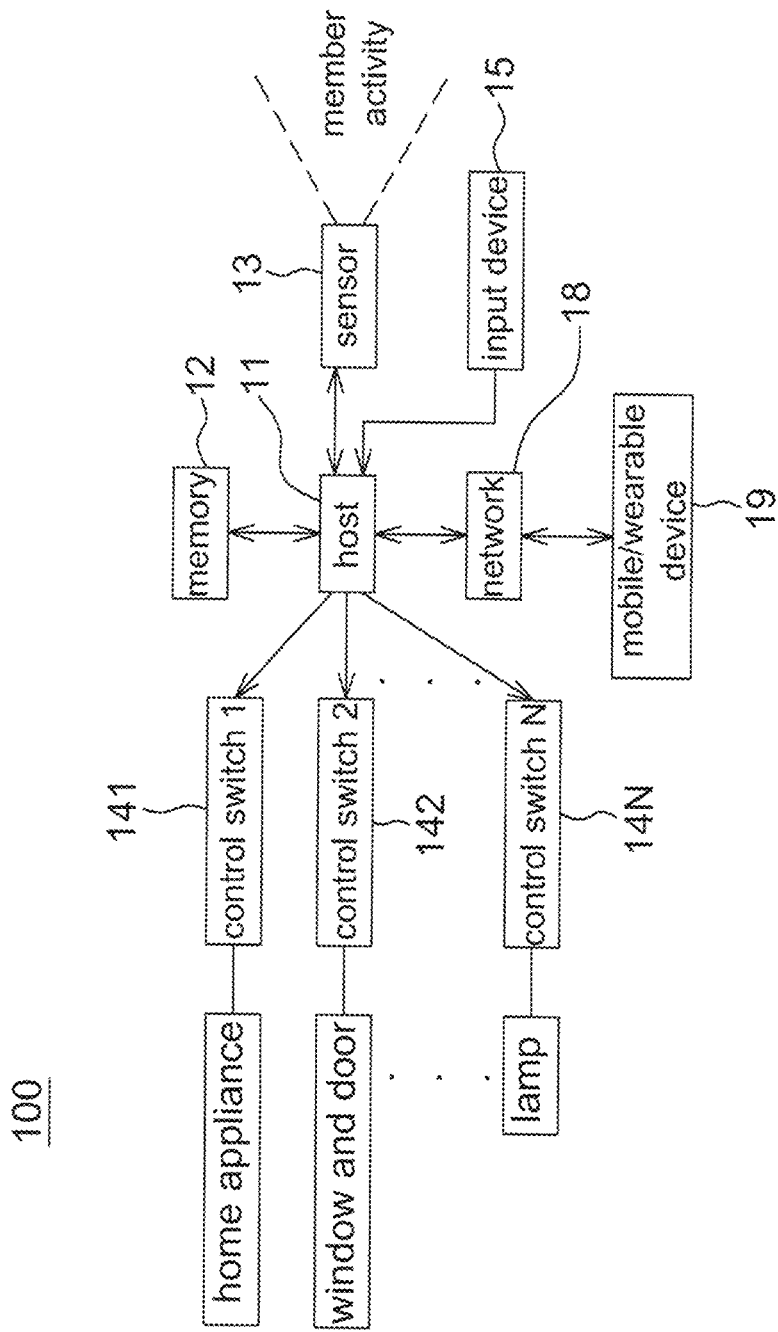
FIG. 1 is a schematic block diagram of a smart home control system according to a first embodiment of the present disclosure.

Referring to FIG. 1, it is a schematic block diagram of a smart home control system 100 according to a first embodiment of the present disclosure. The smart home control system 100 includes a host 11, a memory 12, at least one sensor 13 (one sensor being shown herein, but not limited to), a plurality of control switches 141 to 14N and an input device 15. The plurality of control switches 141 to 14N are, for example, electronic switches or valves to perform at least one of turning on/off home appliances, turning on/off a security system, turning on/off lamps, changing operating strength of home appliances, changing brightness of lamps and opening/closing windows and doors.

The memory 12 includes volatile memory and/or non-volatile memory, and is used to previously record a correspondence relationship between multiple family members and on/off of the plurality of control switches 141 to 14N. For example, the correspondence relationship is set in a setting phase by the family members, e.g., changing and setting using a human machine interface of the input device 15, wherein the input device 15 includes, for example, at least one of a mouse device, a keyboard, a joystick, a display screen, a microphone (e.g., speech agent), a touch device or the like. In some aspects, all or a part of the input device 15 is embedded in the host 11.

Referring to FIG. 2, it is a schematic diagram of the correspondence relationship in a smart home control system 100 according to a first embodiment of the present disclosure. The memory 12 records information (shown as state indication in FIG. 2) of whether each of the family members is at home or not. For example, if one family member is at home, a digital value (e.g., shown as 1) having at least one bit is used to indicate his/her state; whereas, if one family member is not at home, a digital value (e.g., shown as 0) having at least one bit is used to indicate his/her state, wherein whether one family member is at home or not is confirmed automatically by the host 11 according to the detection result of the sensor 13 (an example being given below). In other aspects, whether one family member is at home or not is set by using the input device 15, e.g., pressing a key, through conversation or clicking an icon on a graphical interface.

The correspondence relationship includes, for example, the relationship between in/out (or enter/leave) of a member with a control switch set and/or the relationship between a combination of staying members (or absent member) and a combination of control switches, as shown in FIG. 2. For example, when a male member enters or leaves the house, a first control switch set is turned on/off; when a female member enters or leaves the house, a second control switch set is turned on/off; when only elders and children are at home (i.e. staying members), a first combination of control switches is activated; whereas, when nobody is at home, a second combination of control switches is activated. Some family members are set not to activate any control switch, e.g., children. Each control switch set or combination of control switches includes at least one control switch.

The sensor 13 is used to acquire activity data of multiple family members, and transmit the acquired activity data to the host 11 for the entering/leaving identification, voiceprint identification and face recognition. The sensor 13 includes, for example, a CCD image sensor, a CMOS image sensor, a thermal sensor, an audio sensor and radio sensor (e.g., RFID) or other sensors capable of acquiring data to be used of ID recognition and in/out identification. For example, if the sensor 13 is an audio sensor (e.g., a microphone), the activity data is contained in the acquired voice data; if the sensor 13 is an image sensor, the activity data is contained in the acquired image frame; and if the sensor 13 is a thermal sensor, the activity data is contained in the acquired thermal image. To detect the entering and leaving of a member, the sensor 13 is preferably arranged at an entrance or at a position capable of monitoring at least the condition of the entrance, but the present disclosure is not limited thereto. If the sensor 13 is an audio sensor, it may be arranged at anyplace that can receive the member voice.

In some aspects, the sensor 13 includes an application specific integrated circuit (ASIC) or a digital signal processor (DSP) that performs the identification according to the activity data at first and then sends the identified result (e.g., indicated by at least one bit) to the host 11 for controlling the corresponding control switches.

The host 11 is selected from various fixed or movable computers that have calculating ability, e.g., a personal computer, desktop computer, notebook computer, tablet computer, security server or the like without particular limitations. The host 11 is coupled (e.g., wired or wireless) to the memory 12 and the sensor 13 to receive the activity data therefrom and access the memory 12. In some aspects, the memory 12 is embedded in the host 11.

The host 11 includes a processor, e.g., a central processing unit (CPU) or a microcontroller unit (MCU), to perform a member identification (ID) of one of the multiple family members who enters or leaves the house, and access the correspondence relationship in the memory 12 according to the member ID of staying members or the entering/leaving member among the multiple family members to accordingly control on/off of the plurality of control switches 141 to 14N thereby achieving the purpose of controlling home appliances.

For example, when the sensor 13 is an image sensor, the host 11 performs the face recognition according to the image frame to recognize a member ID of a entering or leaving member. The face recognition is performed by conventional face recognition algorithm as long as the facial features or parameters of every family member are recorded in a setting phase. The facial features or parameters of every family member are recorded in the memory 12 or on the cloud. When the image sensor is arranged at an entrance of the house, the host 11 recognizes the member ID when one family member passes the entrance and then changes setting of the state indication in the memory 12 corresponding to a passing member, e.g., from 1 to 0 or from 0 to 1, to indicate a state change of the passing member. The host 11 then controls the plurality of control switches 141 to 14N according to a state of the passing member or a combination of states of the staying members (i.e. members at home) or absent members (i.e. members not at home).

For example, when one family member leaves the house, all home appliances in the bedroom thereof are turned off and a leaving state is optionally shown on a display screen of the input device 15. For example, when only elders and children are left in the home, the window at balcony and the gas valve are turned off and the indoor camera or the thermal sensor are turned on.

For example, when the sensor 13 is an audio sensor, the host 11 performs voiceprint recognition according to the acquired voice data to recognize a member ID of an entering/leaving member and performs a natural language processing (NLP) to identify a proceeding direction thereof. For example, the host 11 is embedded with conversation function such that it is able to identify whether a family member is entering or leaving the house according to a dialogue with the family member to accordingly control the corresponding control switch set. The conversation function is implemented by the trained model and parameters integrated in the host 11, or by coupling a commercial intelligent voice device or smart speaker (e.g., used as an input device) with the host 11 without particular limitations.

In other aspects, the sensor 13 includes two or more than two sensors, e.g., including both an image sensor and an audio sensor. The host 11 recognizes a member ID according to the image frame and identifies a proceeding direction thereof using the NLP, or vice versa.

In some aspects, the host 11 is further connected to a network 18 to receive positioning signals of multiple family members via the network 18. The network 18 includes, for example, at least a wireless network or a local network. The position signals are provided, for example, by the positioning system of a mobile/wearable device 19 (e.g., a smart phone or smart bracelet, but not limited to) and sent to the host 11 via the network 18. In one aspect, the host 11 identifies a leaving (or absent) member and a staying member according to the positioning signals. In one aspect, the host 11 identifies a family member with the positioning signals thereof entering a predetermined range (e.g., going home within a short time) of the host 11 as an expected staying member, i.e., a number of staying members going to increase. The host 11 accesses the correspondence relationship in the memory 12 according to both the staying member and the expected staying member to control the plurality of control switches 141 to 14N, e.g., previously turning on or turning up the air conditioner, windows or water heater. This aspect is especially suitable to the case that there is no one at home, i.e. a number of staying members being zero.

Figure 3:
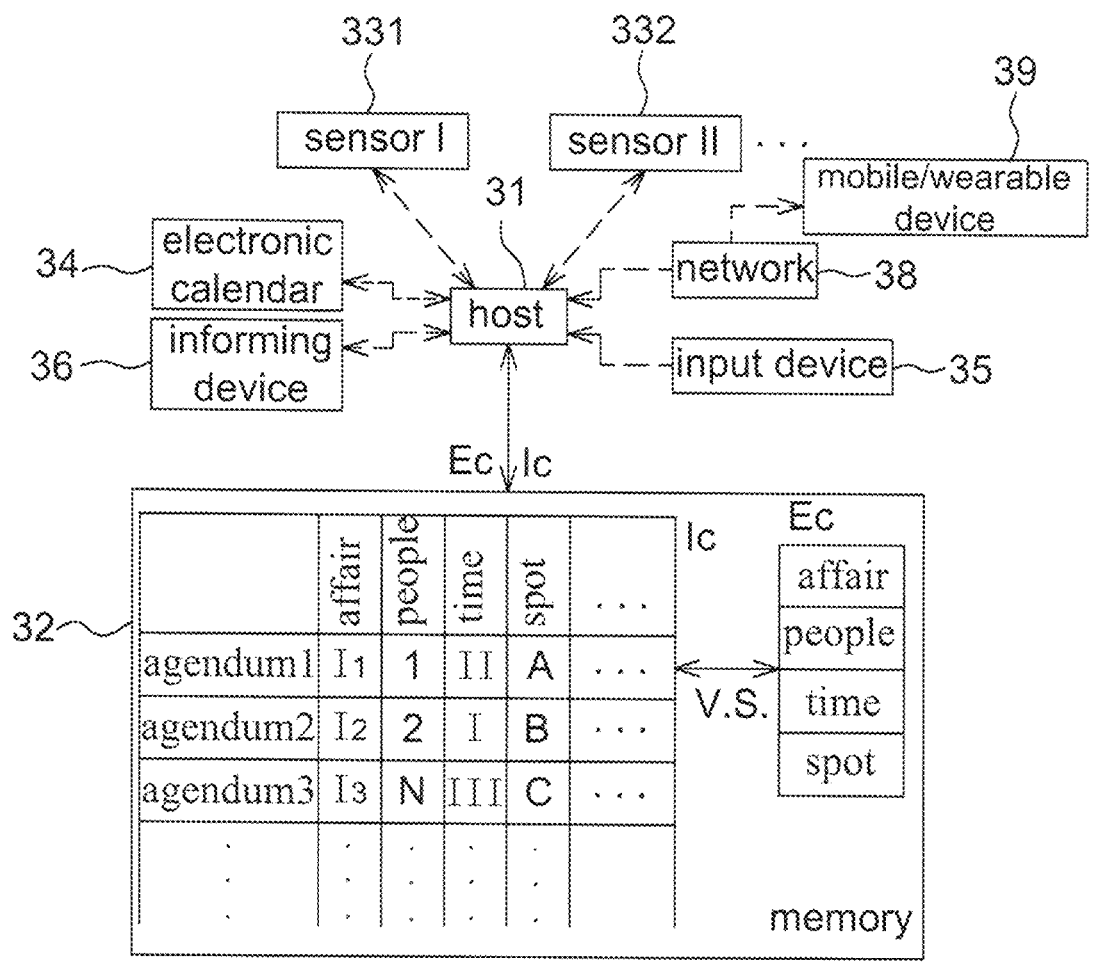
FIG. 3 is a schematic block diagram of a smart home control system according to a second embodiment of the present disclosure.

Referring to FIG. 3, it is a schematic block diagram of a smart home control system 300 according to a second embodiment of the present disclosure. The smart home control system 300 includes a host 31, a memory 32, a plurality of sensors (two sensors being shown herein, but not limited to), an electronic calendar 34, an input device 35 and an informing device 36. In some aspects, the electronic calendar 34 is edited via the input device 35 or a mobile/wearable device 39. In other aspects, the electronic calendar 34 is an individual electronic device and has its own input interface.

The memory 32 includes volatile memory and/or nonvolatile memory, and is used to record multiple agenda including at least one of, for example, purchasing objects, people contact, paying bills, carrying objects, and proceeding positions, wherein the multiple agenda occur at identical or different times to be recorded by the smart home control system 300. Each of the multiple agenda is recorded by an item code having multiple bits. The item code includes, for example, at least one of a member bit, a category bit, a temporal bit and a position bit.

The member bit (shown as people in FIG. 3) is used to indicate or mark a family member (or member ID) who is suitable to execute an agendum. For example, if a digital value of the member bit is "1", it means that the associated agendum is suitable to be executed by a male member; if a digital value of the member bit is "0", it means that the associated agendum is suitable to be executed by a female or young member; and if the member bit is a null-bit (shown as N in FIG. 3), it means that the associated agendum is suitable to be executed by any family member.

In some aspects, one agendum is suitable to be executed or not executed by a family member according to more than one bit, e.g., executed by an adult and male member (e.g., the member bit having two bits, one for indicating an adult or not, and the other one for indicating a male member or not), or suitable to executed or not executed by more than one family member, e.g., not executed by an elder and a child. That is, one agendum has multiple limitations of family members indicated by the member bit.

In some aspects, one agendum is set to be executed based on a priority of family member, e.g., the member bit having another bit for indicating or defining the priority associated with one agendum. If the family member having a higher priority is not able to execute one agendum (e.g., due to the indication of other bits as mentioned below), said one agendum is automatically changed to the family member having a lower priority. In some aspects, the priority is set by more than one bits, e.g., one bit for indicating male and one bit for indicating adult; one bit for indicating female and one bit for indicating adult. In other aspects, the priority is indicated or defined by the temporal bit as below. That is, the member bit includes multiple bits respectively used to indicate different features of every family member.

The category bit (shown as affair in FIG. 3) is used to indicate or mark a type of an agendum including, for example, the purchasing objects, people contact, paying bills, carrying objects, proceeding positions (shown as $I_1$ to $I_3$ in FIG. 3, but not limited to) as mentioned above. The type of an agendum may be set and changed by family member(s) via the input device 35 or preset in the smart home control system 300.

The temporal bit (shown as time in FIG. 3) is used to indicate or mark an execution interval or priority of an agendum. For example, if a digital value of the temporal bit is "1", (show as I in FIG. 3) it means that the associated agendum is a normal level and it is not necessary to accomplish this agendum in a hurry.

In this case, when a family member associated with a current event does not match this agendum (illustrated by an example below), the family member is not informed to execute this agendum. However, if a digital value of the temporal bit is "10" (show as II in FIG. 3), it means that the associated agendum is an emergency. In this case, even when a family member associated with a current event does not match this agendum, the family member is still informed to execute this agendum. For example, if one agendum is set to be executed by a male member but when the temporal bit of the one agendum is indicated as an emergency, this agendum is still informed to other family members. In some aspects, even though a current agendum is indicated as an emergency, the current agendum is never informed to a specific member, e.g., never noticing a kid or elder, but not limited thereto. That is, some agenda are always set to be executed or not executed by a specific family member.

Besides, if a digital value of the temporal bit is "11" (show as III in FIG. 3), it means that the associated agendum is preferably executed at morning; and other digital values of the temporal bit are used to indicate that the associated agendum is preferably executed in other interval of a day, e.g., in the afternoon or at night. That is, the temporal bit includes more than one bit to indicate different features, e.g., priority and suitable interval, of the agenda if required.

The position bit (shown as spot in FIG. 3) is used to indicate or mark an execution position of an agendum, e.g., convenient store, supermarket, restaurant, book store, friend's home (shown as A to C in FIG. 3, but not limited to). That is, different digital values of the position bit are used to indicate different positions of one agendum.

In some aspects, as long as the category bit of one agendum is determined, the corresponding member bit, temporal bit and spot bit are determined. In the present disclosure, one agendum is suitable to be executed by more than one family member, within more than one interval and/or at more than one position.

It is appreciated that a bit number of the item code (Ic) is determined according to the information needed to indicate.

In another aspect, the smart home control system 300 includes multiple registers to respectively indicate the item code including the member bit, the category bit, the temporal bit and the position bit. That is, the host 31 sets the item code by setting the state of the multiple registers.

The smart home control system 300 sets the item code of agenda according to detection results of the plurality of sensors 331, 332 . . . . In some aspects, the sensor is embedded in a smart home appliance, e.g., in a smart refrigerator or a smart lamp device. The smart refrigerator is integrated with multiple sensors used to detect storage amount of goods and the detected result is sent to the host 31 after the smart refrigerator is coupled to the host 31. In other aspects, the sensor is arranged as individual CCD image sensors, CMOS image sensors, thermal sensors, audio sensors, radio sensors (e.g., RFID) or the like.

The host 31 is selected from various fixed or movable computers that have calculating ability, e.g., a personal computer, desktop computer, notebook computer, tablet computer, security server or the like without particular limitations. The host 31 is coupled (wired or wireless) to the memory 32 and the plurality of sensors 331, 332 . . . to give a new item code of a new agendum detected by one of the plurality of sensors, and the new item code is recorded in the memory 32. For example, when a smart refrigerator detects that the egg is run out or when a smart lamp device detects that a lamp is burn-out, a signal is sent to the host 31. The host 31 takes this signal as a new agendum, and gives, for example, the member bit as N, the category bit as shopping (e.g., $I_1$), the temporal bit as I (e.g., normal item), and the position bit as supermarket (e.g., A) as a new item code to be recorded.

In some aspects, the host 31 further compares (in a bit-by-bit manner) the correlation or similarity of a new item code of a new agendum with the item codes of the recorded multiple agenda (i.e. the existed agenda) to confirm whether to combine or link (e.g., to be informed together) the new agendum to one of the existed agenda. For example, when the member bit, category bit, temporal bit and position bit of a new agendum are fully identical to the item code of one existed agendum or a list of existed agenda, the host 31 combines or links the new agendum to the existed agendum or the list of existed agenda to improve the operation efficiency.

In some aspects, if one bit of a new item code of a new agendum is set as "Null", the one bit of the new item code is similar or correlated to a corresponding bit of any recorded item code, i.e. null-bit having no limitation and having a lowest priority. Accordingly, if the new agendum is combined or linked to one recorded agendum that has limited item code, e.g., limited to be executed by a specific member, within a specific interval or at a specific spot, the new agendum (originally having null-bit) is then limited to be executed by the same limitation as the recorded agendum to which the new agendum is combined or linked, i.e. null-bit being changed to be the same as the recorded agendum.

In other words, the host 31 monitors the happening in the house via a plurality of sensors 331, 332 . . . and sequentially gives a code thereto to be recorded in the memory 32 as the agenda. Besides, an agendum may be known by checking the electronic calendar 34. For example, if one family member edited an appointment with someday in the electronic calendar 34, after checking the electronic calendar 34, the host 31 takes this appointment as a new agendum and gives an item code (including bits of people, affair, time and spot as shown in FIG. 3) thereof to be recorded in the memory 32. The recorded agendum is informed to the associated family member at the someday.

When recognizing a current event, the host 31 gives an event code (Ec) of the current event, and then compares the event code with the recorded multiple item codes (Ic) to determine related agenda of the current event among the existed multiple agenda. For comparing with the item codes, the current event is also preferably indicated by people, affair, time and spot, e.g., the event code includes at least one of an event member bit, an event category bit, an event temporal bit and an event position bit corresponding to the item bits. Similarly, in one aspect, the event member bit, the event category bit, the event temporal bit and the event position bit are indicated by multiple registers.

The comparing is to confirm whether the corresponding bits are identical. When digital values of every bit or register indication of the item code of one agendum are totally or partially (e.g., bit having high priority as mentioned above) identical to those of the event code, the agendum is considered as a related agendum (i.e. item code and event code matching). In the comparing procedure, the host 31 stores the generated event code into the memory 32 at first and then compares with the existed item codes, or the host 32 directly compares the generated event code with the existed item codes and the event code is then cancelled after the comparison. As mentioned above, in the comparing procedure, if one bit of the item code or the event code is indicated or given as "Null", the null-bit is similar or correlated to the corresponding bit.

In the present disclosure, the current event is an event triggered by a person, e.g., including family member leaving and family member having a phone call, but not limited thereto. As long as an event triggered by a person may be linked to deal with an existed agendum at the same time, this event is considered as a current event herein.

In one aspect, it is assumed that the sensor 331 is an image sensor. The host 31 recognizes a member ID according to image frames captured by the image sensor (e.g., face recognition mentioned above) and identifies whether the associated family member goes out or not, e.g., according to the proceeding direction of the member image. When the host 31 identifies a specific member leaving the house, an event code of a leaving event is given. For example, the event member bit is set as a digital value indicating a male member (and an ID if there are more than one male members in the family), the digital value of the event category bit is set by recognizing the dressing (e.g., wearing sportswear) of the male member, and the digital value of the event temporal bit is set according to his leaving time. If it is not able to define the event position bit, the event position bit is set as null-bit, or the proceeding position is identified using other ways (illustrated by an example below).

When the host 31 identifies that the leaving event has related agenda, the informing device 36 is used to inform the related agenda of the current event. The informing device 36 includes a mobile device, a display screen or a dialogue system. The host 31 informs, via the informing device 36, the leaving member such related agenda regarding the goods to be purchased, positions to proceed and items to be carried.

In another aspect, it is assumed that the sensor 332 is an audio sensor. The host 31 recognizes a member ID according to the voice data acquired by the audio sensor (e.g., by the voiceprint as mentioned above) and identifies whether the associated member is having a phone call (e.g., by NLP as mentioned above). After the host 31 identifies a member ID who is on the phone, an event code of a calling event is given. For example, the event member bit indicates an ID of a family member who is having the phone call, the event category bit indicates a phone call, the event temporal bit indicates a calling time zone, and the event position bit indicates at home.

In the present disclosure, when the host 31 is not able to identify a feature of any bit of the member bit, the category bit, the temporal bit or the position bit, the bit is set as null-bit. In comparison, the null-bit matches (e.g., correlated with or similar to as mentioned above) any digital value of a corresponding bit.

When identifying that the calling event has related agenda, the host 31 informs the related agenda of the current event using the informing device 36, e.g., the content to tell the person at the other side of the phone.

Similarly, the host 31 identifies and sets digital values of every bit of a current event according to the detection results of more than one sensor, e.g., performing the face recognition according to the image frame and confirming the heading position or activity according to the voice data.

In other aspects, the host 31 determines every bit of the event code of a current event according to the daily schedule. For example, one of the family members goes to the same position or has the same activity every day or someday of a week, the host 31 sets the event code of a leaving event when identifying the family member goes out at that specific time. The host 31 then actively compares the event code with the accumulated multiple item codes of multiple agenda to confirm the related agenda. The daily schedule is set by the family member via the input device 35 or actively identified according to the feedback of the mobile/wearable device 39.

In other aspects, the host 3 is used to determine the event code according to the content of the electronic calendar 34. For example, when recognizing that one family member is going out (e.g., according to the image frame or voice data), the host 31 retrieves the proceeding position and purpose by checking the electronic calendar 34 to accordingly set the digital values of every bit of the event code to be compared with the recorded item codes.

The position bits of the item code and/or the event code may also be set according to the historical paths of a family member. For example, shops, restaurants or addresses passed by when the family member goes to or comes back from the job position are used to set the position bit. That is, the position bit is not set according to a single position. For example, the smart home control system 300 is connected to a network 38 to receive positioning signals of the family members via the network 38. The positioning signals are generated, for example, by the mobile/wearable device 39 of the family members and transmitted to the host 31 via the network 38. In this way, the host 31 determines the digital values of the position bits of the item code and/or the event code according to the historical paths of the positioning signals. For example, if one family member will pass some specific positions in the way to and from the job position, the host 31 indicates the position bit of an agendum to include multiple passed positions. When detecting that the family member goes to work, the host 31 takes the agendum as a related agendum of the going to work event. It should be mentioned that although the historical paths are illustrated by the job position, the present disclosure is not limited thereto. The historical paths are determined according to any position that a family member goes frequently.

In this embodiment, after the host 31 informs a related agendum using the informing device 36, the informed agendum is not immediately removed from the list of recorded multiple agenda. When one agendum is confirmed to be accomplished by one of the plurality of sensors (e.g., new eggs being put in the case, new lamp being exchanged), by the audio sensor, by the electronic calendar 34 or by input of the input device 35, the host 31 then removes the accomplished agendum from the list of recorded multiple agenda.

The item code and/or the event code may be changed or set via a human machine interface of the input device 35, wherein the input device 35 includes, for example, at least one of a mouse device, a keyboard, a joystick, a screen, a microphone and a touch device. When the input device 35 is coupled to the host 31, the host 31 executes the corresponding control and gives the response based on the installed software and/or hardware. In some aspects, all or a part of the input device 35 is integrated in the host 31.

Figure 4:
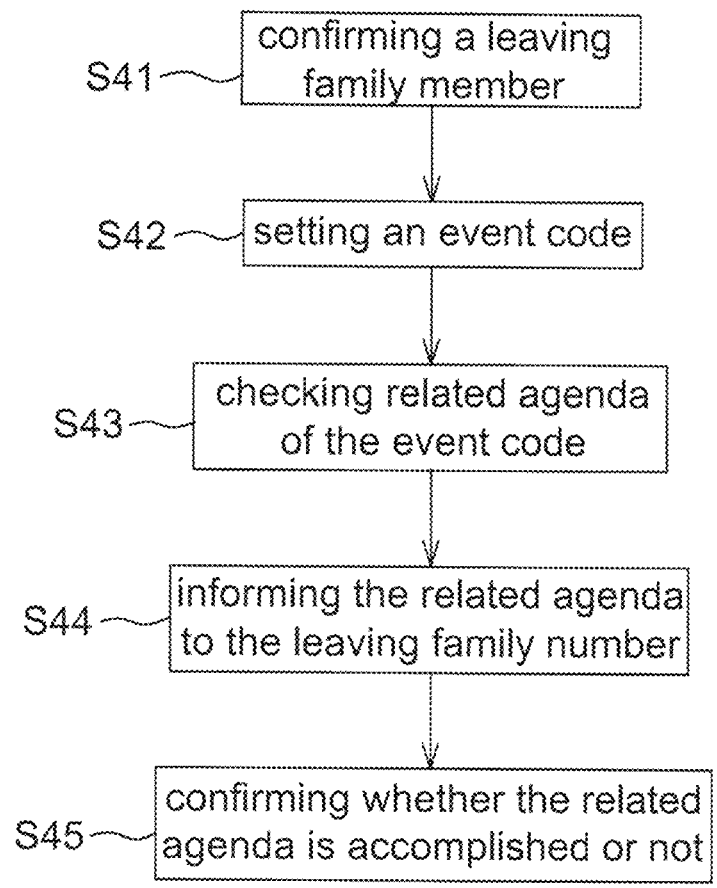
FIG. 4 is a flow chart of an operating method of a smart home control system according to a second embodiment of the present disclosure.

Referring to FIG. 4, it is a flow chart of an operating method of a smart home control system 300 according to a second embodiment of the present disclosure. The operating method includes: confirming a leaving family member (Step S41); setting an event code (Step S42); checking related agenda of the event code (Step S43); informing the related agenda to the leaving family number (Step S44); and confirming whether the related agenda is accomplished or not (Step S45). In this embodiment, the current event is illustrated by a leaving event as an example. As mentioned above, the current event may be other events triggered by a person. Referring to FIGS. 3-4 together, details of one example of this operating method are illustrated below.

Step S41: Before the occurring of a current event, it is assumed that the memory 32 has previously recorded at least one agendum. As mentioned above, the agendum is detected by the sensors 331, 332 . . . , confirmed from the electronic calendar 34, or inputted via the input device 35. The host 31 detects the current event via the sensors 331, 332 . . . , e.g., a family member going out, and the detecting method has been illustrated above and thus are not repeated. When the host 31 is triggered by the current event, the Step S42 is entered.

Step S42: The host 31 sets the event code, including changing the digital value or register states, of the current event according to the detection results of the sensors or information from other peripheral devices (e.g., electronic calendar 34 or input device 35). As mentioned above, the host 31 may or may not store the generated event code into the memory 32.

Step S43: Next, the host 31 checks whether the existed agenda have any related agendum of the event code. As mentioned above, the host 31 checks the related agenda by comparing the event code with every item code. It is appreciated that if the memory 32 does not record any agendum, the comparing is not performed.

Step S44: If the memory 32 does contain the related agendum of the event code of the current event, the host 31 uses the informing device 36 or the mobile/wearable device 39 to notify the event member to execute the related agendum. If the agenda in the memory 32 do not match (correlated or similar) the event code (e.g., more than a predetermined number of corresponding bits having different digital values), the recorded agenda are not informed to the current event member and awaiting to be executed by other family members.

Step S45: Finally, when the host 31 receives a message indicating that one agendum is accomplished, e.g., from the sensor 331, 332 . . . , electronic calendar 34, the input device 35 and/or mobile/wearable device 39, the accomplished agendum is cancelled or removed from the memory 32.

It should be mentioned that although the second embodiment is illustrated in a way that one family member is about to go out, the present disclosure is not limited thereto. In other aspects, if the memory 32 has not recorded any agendum when one family member passes the entrance to go out, the smart home control system 300 still takes the absent event as a current event, and gives an event code (Ec) of the absent event to be recorded in the memory 32 when recognizing the absent event. If a new agendum occurs (e.g., detected by one of the plurality of sensors) when the family member is still outside, the host 31 gives a new item code to the new agendum and compares the new item code with the recorded event code to determine whether the new agendum is a related agendum of the recorded absent event. If the agendum is confirmed as a related agendum, the host 31 informs the outdoor member via the network 38 to execute the new agendum. However, if the new agendum is not a related agendum, the host 31 accumulates the new agendum in the memory 32 waiting to be informed to other family members, e.g., informed when detecting a leaving event of another family member as an example in the second embodiment mentioned above. Whether the new agendum is a related agendum is identified, for example, according to the correlation or similarity between the new item code and the recorded event code as mentioned above.

In one aspect, the informed family member can refuse to execute the related agendum, e.g. using the input device 35 or the mobile/wearable device 39 to send a refuse signal. In this case, the host 31 continuously holds the agendum waiting to be informed to other family members (in the case the agendum being suitable to be executed by more than one family member). In the case that the related agendum is set to be executed only by the informed family member, the host 31 replies that the related agendum cannot be refused.

In the smart home control system of the present disclosure, the memory further stores software and/or the host is embedded with hardware or firmware used in operation of the above first and second embodiments.

The smart home control system of the present disclosure further helps the family member to search a specific object (e.g., cellphone, keys). For example, the family member tells the smart home control system the specific object to be searched via a smart audio assistant. The host locates the specific object by the image recognition and then informs the family member through the informing device, e.g., showing on a display screen or playing by a speaker.

The smart home control system of the present disclosure further actively reminds a leaving member to bring an umbrella or regarding the weather at the time the family member is about to go out if the raining and high temperature information is obtained from the internet.

The smart home control system of the present disclosure further actively informs, via the mobile/wearable device, the family member to deal with the situation of unclosed stove fire when there is nobody at home. Furthermore, when a fire scene is monitored, the smart home control system actively contacts the local fire brigade.

The smart home control system of the present disclosure further monitors, e.g., by analyzing captured images, the food being eaten by the family member. When it is detected that any family member is about to eat allergenic food, an alarm is provided by the host via the informing device.

The smart home control system of the present disclosure further monitors, e.g., by analyzing captured images, the fragment or fluid on the floor. When the fragment or fluid are detected, a cleaning robot is automatically informed to perform the cleaning job or family members are informed via the informing device or the mobile/wearable device by the host.

The smart home control system of the present disclosure further monitors, e.g., by analyzing captured images or thermal images, the physical discomfort of family members. For example, if the fever, falling or abnormal behavior is detected, other family members are informed by the host via the informing device or the mobile/wearable device. If the unusual situation is continuously not eliminated, a medical institution is contacted.

The smart home control system of the present disclosure further performs the environment control. For example, if the low room temperature, holding tightly the bed sheet or sneeze is detected, e.g., by analyzing captured images or thermal images, the temperature setting is increased. In this case, the controlled device is coupled to the host.

Although the above embodiments are illustrated by multiple family members as an example, the present disclosure is not limited thereto. The smart home control system of the present disclosure is further adaptable to the house having a single member and the control procedure is much easier. Meanwhile, the family member adapted to trigger or activate the smart home control system may be set or changed using the input device or the mobile/wearable device.

Since both the first and second embodiments perform the corresponding function by detecting the entering and leaving of a person, they are combinable to operate together. For example, when detecting the entering and leaving of a family member, the host controls the conducting state of the control switches and prompt the related agendum. In addition, although the above embodiments are illustrated in the way that the host performs the automatic control according to the detection results, the content in the memory may also be set and changed by a family member using the mobile/wearable device via the network.

As mentioned above, in a smart home it is preferably to perform different controls corresponding to different family members and automatically give a hint to a leaving member of an agendum regarding related people, affair, time, spot and object to extend the controllable range. Accordingly, the present disclosure further provides a smart home control system (e.g. FIGS. 1 and 3) and an operating method (e.g. FIG. 4) thereof that perform the indoor automatic control or remind a family member to execute agenda according to the control method and agenda stored in the memory when a host detects the entering and leaving of a family member.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. A smart home control system, comprising:
a memory configured to record multiple agenda each being recorded using an item code comprising at least one of a member bit, a category bit, a temporal bit and a position bit;
multiple sensors; and
a host, coupled to the memory and the multiple sensors, and configured to
give a new item code of a new agendum to be added in the memory when one of the multiple sensors detects the new agendum, wherein the new agendum is recorded waiting to be informed to and executed by a family member,
give an event code of a current event when the current event is recognized, and compare the event code with recorded multiple item codes to determine related agenda of the current event among the multiple agenda, wherein the multiple agenda are executed by the family member outside a house, and the current event is the family member leaving the house, and wherein one of the multiple sensors is an image sensor, and the host is configured to give bits of the event code of the current event according to image frames acquired by the image sensor.

2. The smart home control system as claimed in claim 1, wherein the host is further configured to compare correlation between the new item code of the new agendum and the recorded multiple item codes of the multiple agenda to determine whether to combine or link the new agendum to one of the multiple agenda.

3. The smart home control system as claimed in claim 1, wherein the bits of the event code given by the host comprise an event member bit, an event category bit, an event temporal bit and an event position bit.

4. The smart home control system as claimed in claim 3, wherein the host is further configured to give the event member bit, the event category bit, the event temporal bit and the event position bit of the event code of the current event according to a daily schedule.

5. The smart home control system as claimed in claim 3, further comprising an electronic calendar, wherein the host is further configured to determine at least one of the event code and the item code according to content of the electronic calendar.

6. The smart home control system as claimed in claim 1, wherein the current event further comprises family member having a phone call.

7. The smart home control system as claimed in claim 1, wherein the host is further
connected to a network to receive positioning signals of the family members via the network, and
configured to determine at least one of the event code and the item code according to historical paths of the positioning signals.

8. The smart home control system as claimed in claim 1, further comprising an input device configured to provide a human machine interface for setting or changing at least one of the item code and the event code.

9. The smart home control system as claimed in claim 1, further comprising an informing device, wherein the host is further configured to inform the related agenda of the current event via the informing device.

10. The smart home control system as claimed in claim 1, wherein when one of the multiple sensors detects one of the multiple agenda is accomplished, the host is further configured to remove an accomplished agendum from the recorded multiple agenda.

11. The smart home control system as claimed in claim 1, wherein the multiple agenda comprise purchasing objects and paying bills in a store.

12. A smart home control system, comprising:
a memory configured to record at least one agendum which is recorded using an item code comprising at least one of a member bit, a category bit, a temporal bit and a position bit;
multiple sensors; and
a host, coupled to the memory and the multiple sensors, and configured to
give an event code of an absent event to be recorded in the memory when the absent event is recognized,
give a new item code of a new agendum when one of the multiple sensors detects the new agendum, wherein the new agendum is recorded waiting to be informed to and executed by a family member, and
compare the new item code with the recorded event code to determine whether the new agendum is a related agendum of the absent event,
wherein the at least one agendum and the new agendum comprise purchasing objects and paying bills in a store.

13. A smart home control system, comprising:
a memory configured to record multiple agenda each being recorded using an item code comprising at least one of a member bit, a category bit, a temporal bit and a position bit;
multiple sensors; and
a host, coupled to the memory and the multiple sensors, and configured to
give a new item code of a new agendum to be added in the memory when one of the multiple sensors detects the new agendum, wherein the new agendum is recorded waiting to be informed to and executed by a family member,
give an event code of a current event when the current event is recognized, and
compare the event code with recorded multiple item codes to determine related agenda of the current event among the multiple agenda,
wherein the multiple agenda are executed by the family member outside a house, and the current event is the family member leaving the house, and
wherein one of the multiple sensors is an audio sensor, and the host is configured to give bits of the event code of the current event according to voice data acquired by the audio sensor.

14. The smart home control system as claimed in claim 13, wherein the bits of the event code given by the host comprise an event member bit, an event category bit, an event temporal bit and an event position bit.

* * * * *